Figure 21:
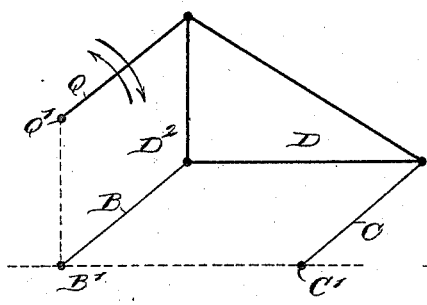
Figure 22:
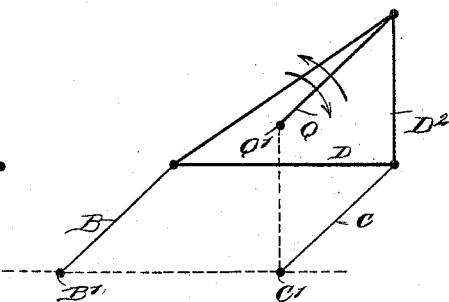
Figure 23:
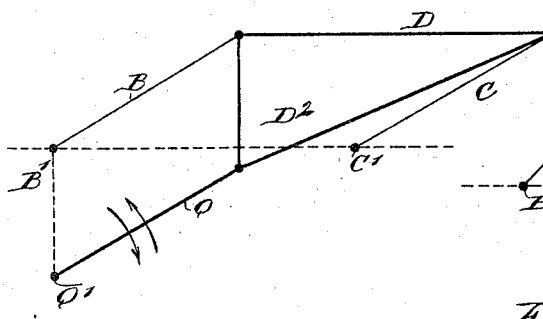
Figure 24:
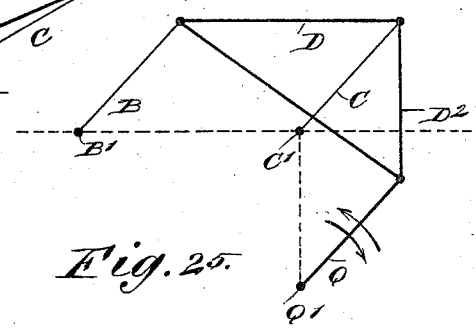

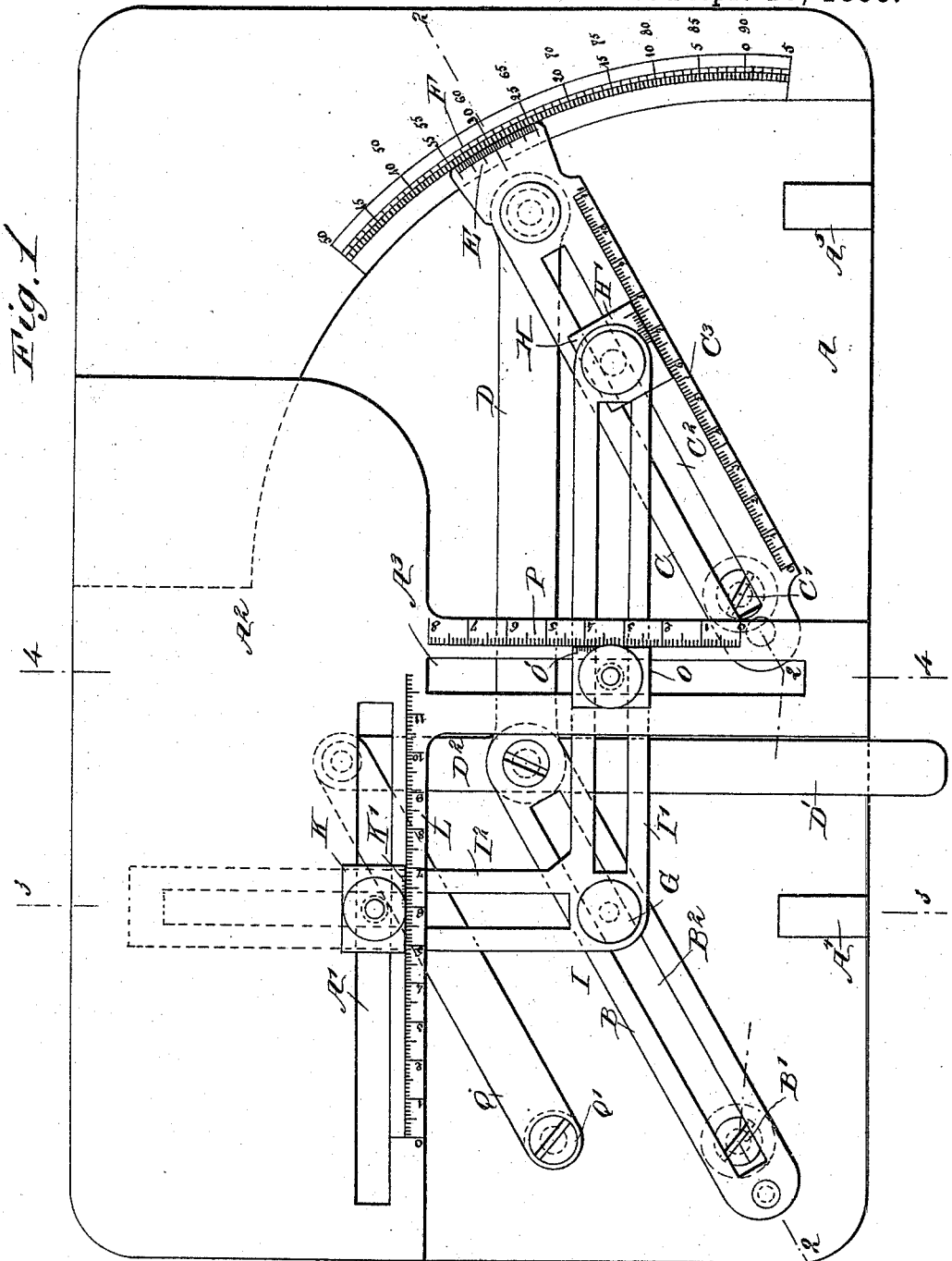

(No Model.)  7 Sheets—Sheet 2.
A. L. LACOSTE.
TRIGONOMETRICAL CALCULATING AND MEASURING INSTRUMENT.
No. 537,782.  Patented Apr. 16, 1895.
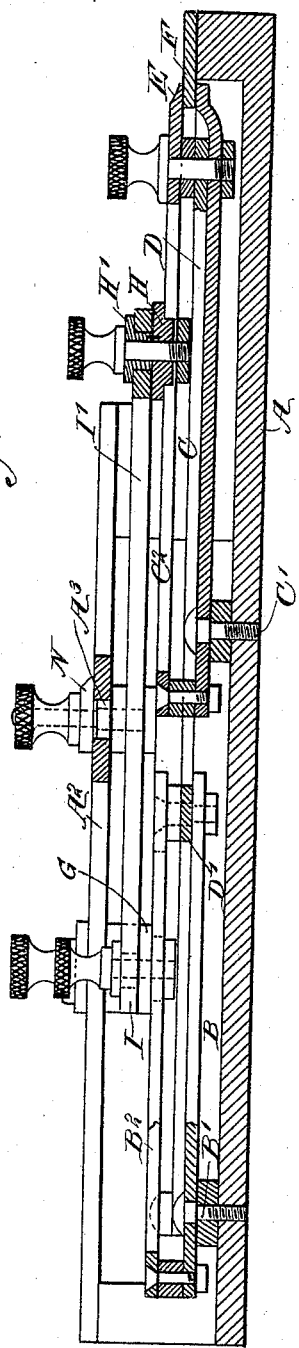
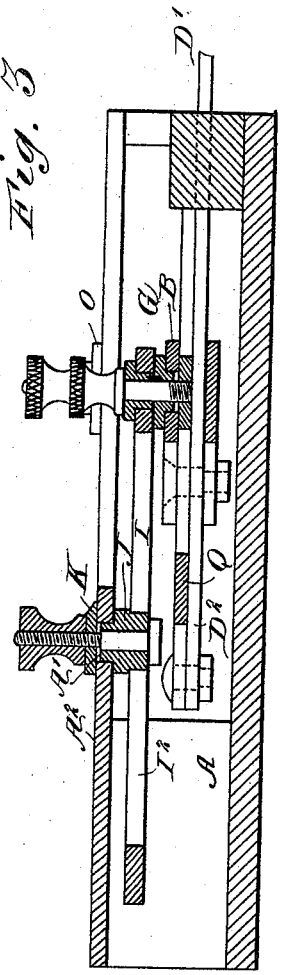
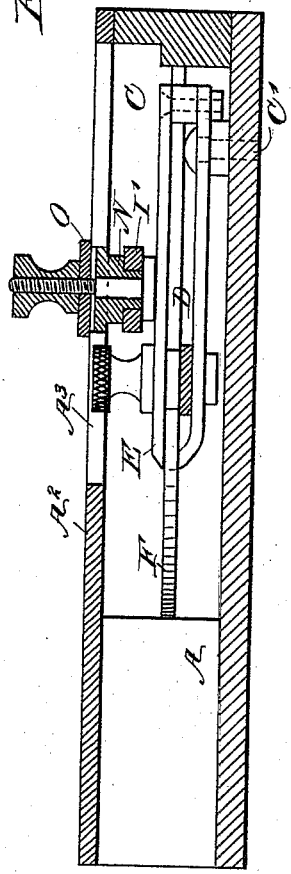
WITNESSES:
C. Neveux
C. Sedgwick
INVENTOR
A. L. Lacoste
BY
Munn & Co
ATTORNEYS.

(No Model.) 7 Sheets—Sheet 3.
A. L. LACOSTE.
TRIGONOMETRICAL CALCULATING AND MEASURING INSTRUMENT.
No. 537,782. Patented Apr. 16, 1895.
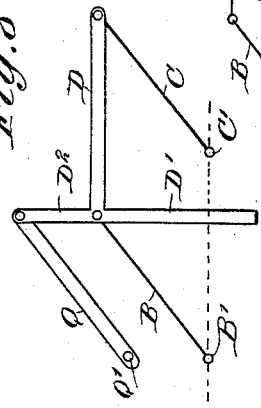
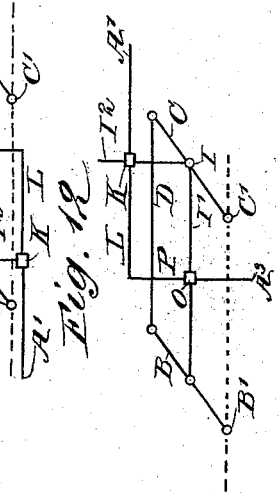
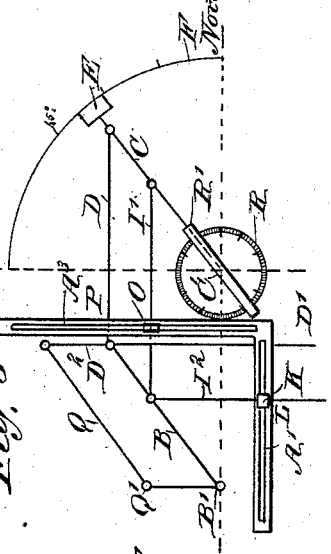
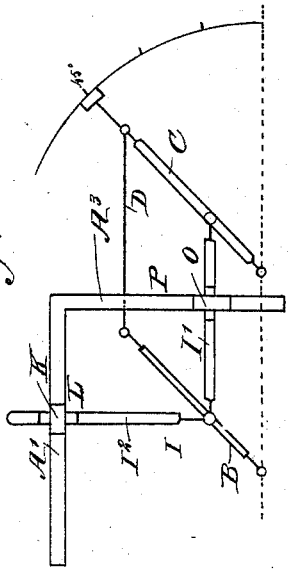
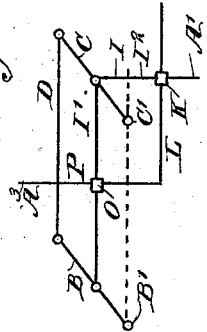
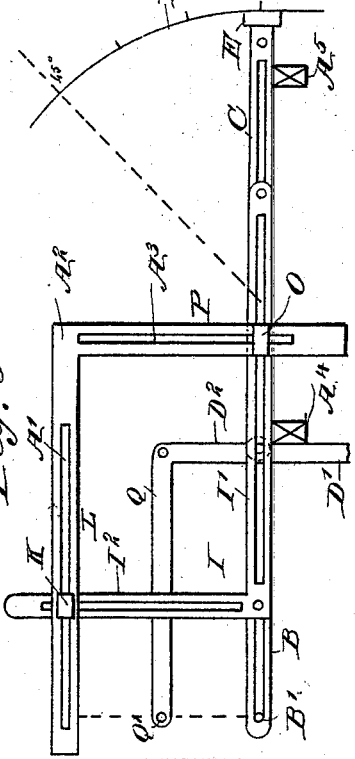
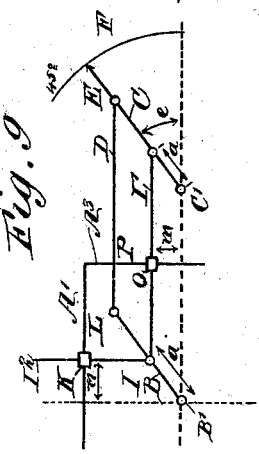
WITNESSES:
C. Neveux
C. Sedgwick
INVENTOR
A. L. Lacoste
BY
Munn & Co
ATTORNEYS.

(No Model.) 7 Sheets—Sheet 4.
A. L. LACOSTE.
TRIGONOMETRICAL CALCULATING AND MEASURING INSTRUMENT.
No. 537,782. Patented Apr. 16, 1895.
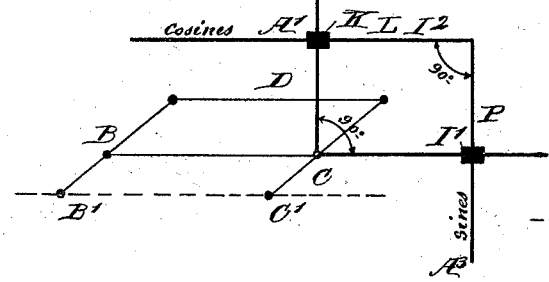
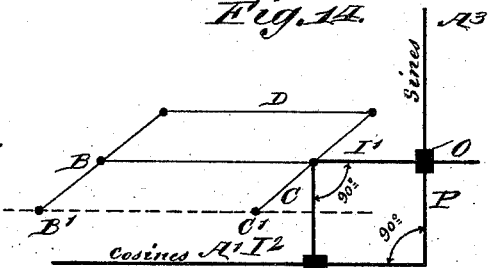
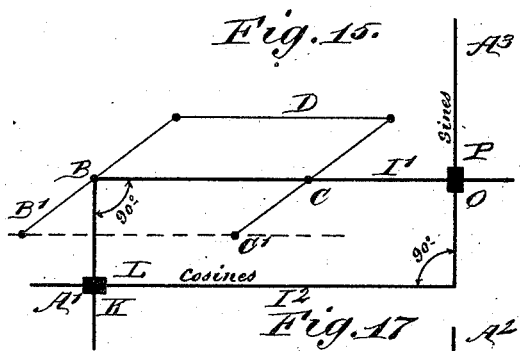
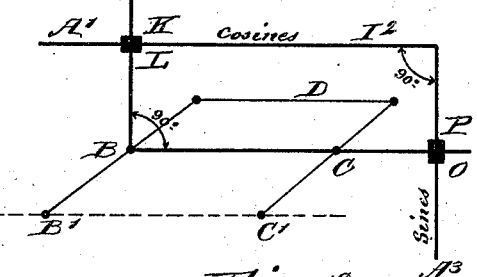
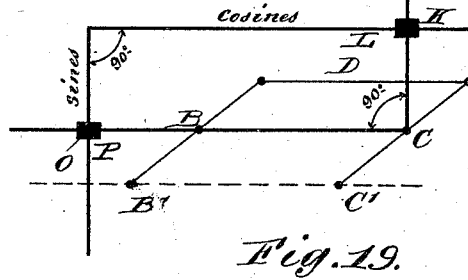
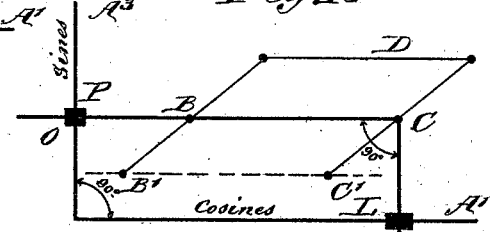
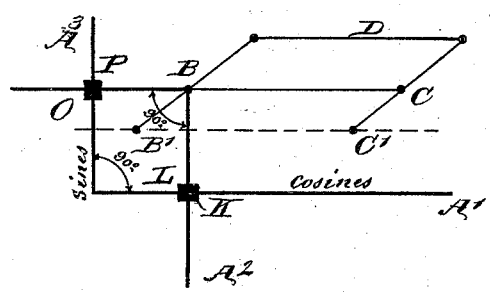
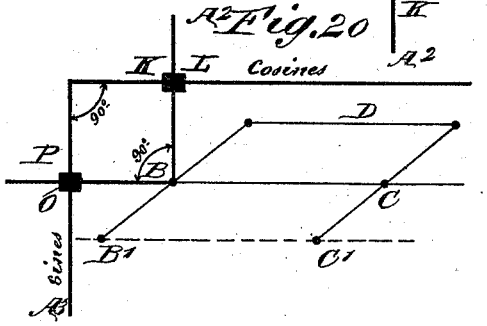
WITNESSES:
C. Neveux
C. Sedgwick
INVENTOR
A L Lacoste
BY
Munn & Co
ATTORNEYS.
THE NORRIS PETERS CO., PHOTO-LITHO., WASHINGTON, D. C.

(No Model.) 7 Sheets—Sheet 5.

A. L. LACOSTE.
TRIGONOMETRICAL CALCULATING AND MEASURING INSTRUMENT.

No. 537,782. Patented Apr. 16, 1895.

WITNESSES:
C. Neveux
C. Sedgwick

INVENTOR
A. L. Lacoste
BY
Munn & Co.
ATTORNEYS.

(No Model.) 7 Sheets—Sheet 6.

A. L. LACOSTE.
TRIGONOMETRICAL CALCULATING AND MEASURING INSTRUMENT.

No. 537,782. Patented Apr. 16, 1895.

WITNESSES:
C. Neveux
C. Sedgwick

INVENTOR
A. L. Lacoste
BY
Munn & Co
ATTORNEYS.

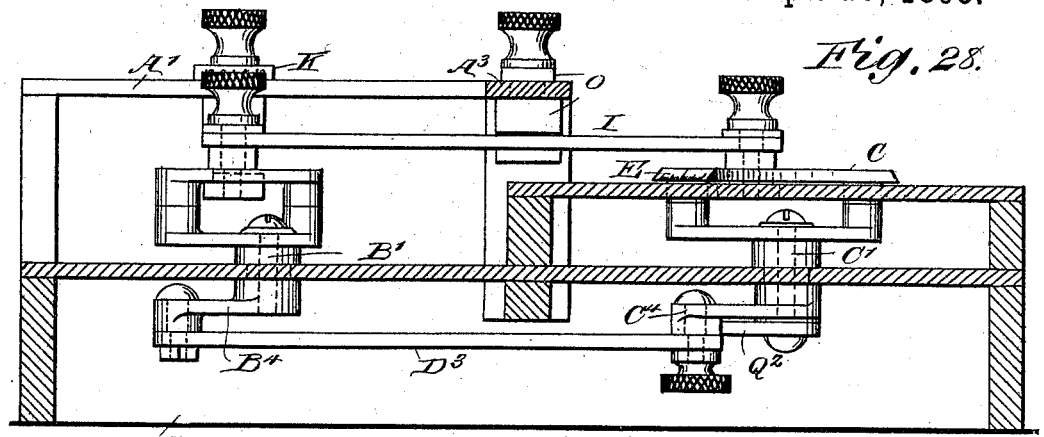
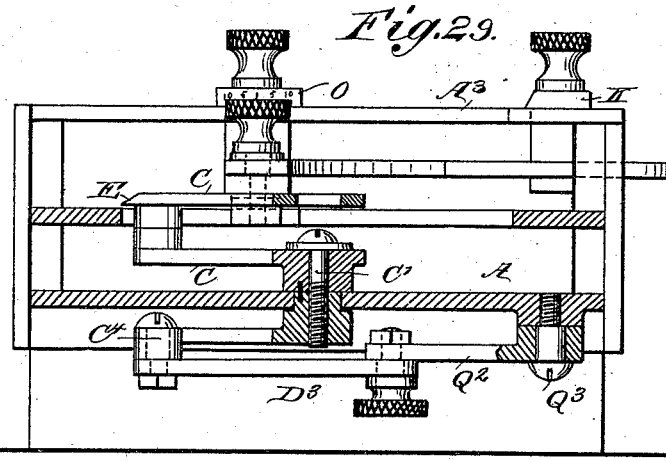
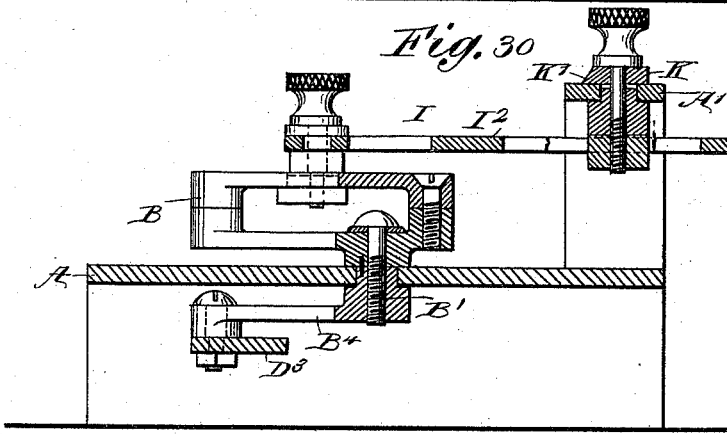

United States Patent Office.

ADOLPHE L. LACOSTE, OF NATCHITOCHES, LOUISIANA.

TRIGONOMETRICAL CALCULATING AND MEASURING INSTRUMENT.

SPECIFICATION forming part of Letters Patent No. 537,782, dated April 16, 1895.

Application filed January 17, 1894. Serial No. 497,136. (No model.)

*To all whom it may concern:*

Be it known that I, ADOLPHE LAURENT LACOSTE, of Natchitoches, in the parish of Natchitoches and State of Louisiana, have invented a new and useful Trigonometrical Calculating and Measuring Instrument, of which the following is a full, clear, and exact description.

The invention relates to calculating and measuring instruments, and its object is to provide a new instrument which is comparatively simple and durable in construction, easily manipulated, and more especially designed to enable surveyors and others to readily obtain without the use of tables, the sine or cosine corresponding to a given distance and to a given angle. The said device also forms a mechanical traverse table, giving for any angle and any distance the projections of said distance corresponding to said angle, and also forms a mechanical table of natural sines and cosines.

The invention consists of certain parts and details, and combinations of the same, as will be hereinafter described and then pointed out in the claims.

Reference is to be had to the accompanying drawings, forming a part of this specification, in which the same letters of reference indicate the same or corresponding parts in all the figures.

Figure 1 is a plan view of the improved instrument, with graduations from zero to forty-five degrees. Fig. 2 is a sectional side elevation of the same on the line 2—2 of Fig. 1. Fig. 3 is a cross section of the same on the line 3—3 of Fig. 1. Fig. 4 is a similar view of the same on the line 4—4 of Fig. 1. Figs. 5 to 25 are diagrammatic views illustrating the use of the instrument. Fig. 26 is a plan view of a modification arranged for directly giving sines and cosines for angles from zero to three hundred and sixty degrees. Fig. 27 is an inverted plan view of the same. Fig. 28 is a sectional side elevation of the same on the line 28—28 of Fig. 26. Fig. 29 is a cross section of the same on the line 29—29 of Fig. 26, and Fig. 30 is a similar view of the same on the line 30—30 of Fig. 26.

The improved trigonometrical instrument is provided with a suitable base board or other support A, on which are pivoted at B' and C' the two parallel arms B and C respectively, pivotally connected with each other by a link D so that the two arms B and C, when swinging at their pivots, remain at all times parallel. On the free end of the arm C is arranged a vernier E indicating on a graduation F supported on the base A and arranged on the segment of a circle, as plainly illustrated in Fig. 1. The graduation F indicates degrees and subdivisions.

The arms B and C are formed with longitudinal slots $B^2$ and $C^2$ respectively, in which are fitted to slide blocks G and H respectively, of which the block G is pivotally connected with the apex of a square or two-membered arm I, having its leg I' pivotally connected with a vernier H', forming part of the slide block H moving in the slot $C^2$ of the arm C. The vernier H', indicates on a graduation $C^3$ arranged on the arm C in alignment with the slot $C^2$. The other slotted leg $I^2$ of the square or arm I is provided with a sliding block J (see Fig. 3) engaging a longitudinally extending slot A' formed in an over-hanging board $A^2$ which forms part of the base board A.

The slot in the leg $I^2$ extends at right angles to the slot A', and the block J carries a vernier K formed with a graduation K' indicating on a graduation L arranged alongside the slot A' on the top face of the over-hanging board $A^2$. A block N (see Fig. 4) similar to the block J is fitted to slide in the slot of the leg I' of the arm I, the said block N also engaging a transversely-extending slot $A^3$ formed in the over-hanging board $A^2$. The slots A' and $A^3$, with the slide blocks H and J, form guides for keeping the legs I' and $I^2$ of the square I parallel to their original positions during the movement of the arms B and C.

The block N is connected with a vernier O arranged on top of the board $A^2$ and formed with a graduation O' indicating on a graduation P arranged on the upper surface of the over-hanging board $A^2$ in alignment with the slot $A^3$. The graduation P indicates the sines and the graduation L indicates the cosines for angles less than forty-five degrees, but for angles included between forty-five degrees and ninety degrees the said graduation P will give the cosines and the graduation L the sines.

It is understood that the verniers O and K indicate the respective sine or cosine for the given angle and distance.

To the above mentioned verniers can be attached, if desirable, a clamp and tangent movement screw; also if required a reading lens or glass.

In order to conveniently move the several parts, I provide the link D with a handle D', adapted to be taken hold of by the operator so as to impart a swinging movement to the arms B and C. The handle D' is formed with an extension $D^2$ pivotally connected with an arm Q fulcrumed at Q' on the base board A and arranged parallel to the arm B, as will be readily understood by reference to Figs. 1 and 8. The length of the extension $D^2$ is equal to the distance between the pivots B' and Q'.

The handle D' may be provided with clamp and tangent movement screw if desired.

On the base board A are arranged the stops $A^4$ and $A^5$ for the arms B and C, so that when the latter rest on the said stops, the vernier E on the arm C indicates zero on the graduation F and the two arms B and C are in alignment with each other. When the device is in this position, the square or right angle arm I can be readily adjusted forward and backward on the arms B and C, whereby the verniers H' and K are shifted to indicate at different points on the graduations $C^3$ and L, and the distance may be read either on graduation $C^3$ or L. When the arm I has been adjusted to the desired point and the operator shifts the handle D' inward, then the arms B and C swing at their pivots and parallel to each other, whereby the square or right angle arm I is carried along, and the two verniers K and O move in their slots A' and $A^3$ to indicate the corresponding sine and cosine for the angle indicated by the vernier E on the graduation F. The length or distance is given by the vernier H' on the graduation $C^3$. When the arms B and C are in alignment with each other, the verniers H' and K should indicate the same values or numbers on graduations $C^2$ and L (test of accuracy of instrument). Consequently graduation $C^3$ and its vernier H' could be suppressed and distance read on graduation L if the instrument is to be used only as a mechanical table of sines and cosines, or as a traverse table. The graduation $C^3$ and its vernier H' are however necessary when using the instrument for solving geometrical problems.

The zero point of the graduation $C^3$ is at the pivot C' of the arm C; the zero point of graduation L is in a line extending through the pivots B' and Q', and the zero point of the graduation P is in a line extending through the pivots B' and C'. The graduation F reads from zero to forty-five degrees upward, and from forty-five degrees to ninety degrees downward, with five degrees more or less above the forty-five degrees, and five degrees more or less below zero, as will be readily understood by reference to Fig. 1.

The connection between the sliding blocks and the respective verniers is by means of a bolt, as will be readily understood by reference to Figs. 2, 3, and 4, so that the sliding block and vernier move together, but permit the part connected therewith to turn whenever movement is given to the several parts constituting the device.

The square or right angle arm I may be arranged in four positions, as indicated in Figs. 9, 10, 11 and 12, with the result always the same, provided the graduations of sines and cosines on graduations P and L are placed in the right position. The square with extended branch, arm or leg may also be arranged in following positions, indicated in Figs. 13 to 20 inclusive, with the result always the same provided the graduations P and L of sines and cosines are placed in the right position. The parallel motion of the arms B and C is secured by means of the link D, extension $D^2$ and arm Q of Fig. 1, or the triangular link D $D^2$ and arm Q of Fig. 25, or the arms $B^4$ and $C^4$, link $D^3$ and arm $Q^2$ of Fig. 27.

In using the instrument the parts are first moved into the position shown in Fig. 5, so that the arms B and C, are in alignment with each other, and then the operator loosens the bolts on the sliding blocks G and H, so as to permit of shifting the square I to the right or to the left until the vernier H' indicates a desired distance, say $a$, on the graduation $C^3$, the distance reading from zero, corresponding to the pivot C', to the desired numeral. As previously mentioned, the distance $a$ can also be read on the graduation L. Now, when the operator pushes on the handle D', or turns the arm $Q^2$ of Fig. 27, the several parts will move until the vernier E finally indicates on the graduation F a desired angle, say $e$, as plainly shown in Fig. 9. The vernier K now indicates on the graduation L a distance $n$ or the cosine corresponding to the distance $a$ and angle $e$, provided the angle $e$ is less than forty-five degrees and the said vernier will also indicate the distance $n$, or sine corresponding to the distance $a$ and angle $e$, provided angle $e$ is greater than forty-five degrees. On the graduation P, the vernier O indicates at the same time the distance $m$, or the sine corresponding to distance $a$ and angle $e$, provided angle $e$ is less than forty-five degrees, and the said vernier also gives distance $m$ or cosine corresponding to distance $a$ and angle $e$, provided angle $e$ is greater than forty-five degrees.

It is understood that the same operation is gone through for any variation in the distance $a$ and angle $e$.

Now, if the vernier O be clamped in position on the over-hanging board $A^2$ at the given distance $m$ indicated on graduation P, and the screws on blocks G, H and J, are loosened, then the square I can be shifted right or left, and if then the vernier K is brought to a distance $n$ on the scale L, then the arm C will turn and vernier E will indicate the angle $e$; also the vernier H' will slide in the groove $C^2$ of the arm C and stop at a distance equal to $a$ at the time the vernier E stops on the angle $e$. Now, let the distance between the pivot $C'$ and vernier $H'=a$; angle $=e$; sine $=m$; and cosine $=n$. When sine $m$ and cosine $n$ are given, the instrument will at once indicate the distance $a$ and the angle $e$ by operating as explained above. When the sine $m$ and angle $e$ are given the instrument will indicate the cosine $n$ and the distance $a$. When sine $m$ and distance $a$ are given, the measuring instrument will indicate the cosine $n$ and angle $e$. When cosine $n$ and angle $e$ are given the sine $m$ and the distance $a$ are indicated by the instrument, and when cosine $n$ and distance $a$ are given, the sine $m$ and angle $e$ are at once read on the instrument. In other words, any two elements of a right angled plane triangle being known or given, the instrument indicates the other elements. Consequently all cases of right angled plane triangles can readily be solved with the device.

The instrument will also indicate the chord of an arc when the angle $e$ and the distance $a$ are given. As the chord or subtense of an arc is twice the sine of one-half the angle given, consequently the side of an inscribed polygon is found when the distance (radius) $a$ and corresponding angle $e$ are given. The instrument, by a simple division will also give the tangent, as $tg = \dfrac{\text{sine}}{\text{cosine}}$, and the co-tangent as $cotg = \dfrac{\text{cosine}}{\text{sine}}$. By subtraction we find vers-sine $= a - \text{cosine} = \text{distance (radius) } a - \text{cosine}$.

It will also be further understood, without going into details, that the instrument will permit of solving quite a number of other geometrical problems. For instance, it will permit of solving any plane triangle when two sides and their included angle are given; also when two angles and included side are given.

As illustrated in Fig. 6, the instrument is arranged in connection with a sighting device, which may be a transit or compass said device being so arranged that the line of sight of the compass or optical axis or line of collimation of telescope of transit corresponds exactly with line from pivot $C'$ to zero of vernier E, the center of limb of compass or transit corresponding exactly to center of pivot $C'$ and line of sight of compass or optical axis of telescope following all motions of the arm C. The sight $R'$ of the compass or the telescope of the transit is made to always follow the motion of the arm C, so that the projection of a certain line making the angle $e$ with the true north line, will be readily read on the scales of the graduations P and L of sines and cosines as the survey progresses.

The instrument above described with compass or transit attached and with the graduation F of only forty-five degrees will answer the purpose only for angles less than forty-five degrees, it, however, being understood that the instrument with graduation from zero to forty-five degrees only without compass or transit attached will answer all purposes for office work. It is also understood that any instrument giving sines and cosines from zero to forty-five degrees will also give sines and cosines for angles from forty-five degrees to ninety degrees and from zero to three hundred and sixty degrees. In order to avoid the change of graduation L from scale of cosines to that of sines when the angle is included between forty-five degrees and ninety degrees, then by having the graduation of limb F extended to ninety degrees (see Fig. 6), instead of forty-five degrees, the graduation L will always remain the scale of cosines, and the same is true as regards the graduation P of sines with a graduation of zero to ninety degrees for limb F.

In surveying, when using the magnetic needle, the angles read are never greater than ninety degrees. Therefore, the instrument with graduation of limb F from zero to ninety degrees will directly give sines and cosines without change of scales. The instrument can also be used independent of the magnetic needle in localities where local attraction is manifested, and this is very desirable at times when careful surveys are required. The graduation F in this case should then be used instead of the graduation of the compass or transit for reading the angles. Instead of complete compass or transit, compass, sights or telescope only may be attached at the pivot $C'$ and made to follow the motion of the arm C and the angles read directly on the graduation F. Such a combination, made in the size of a pocket instrument will be very useful to find directly the distance from one point to an inaccessible point, or during war times, for instance, the distance between two armies, or the distance to a fortress, &c., to enable artillery to be pointed with accuracy.

By reference to Fig. 8, it will be noticed that the arm Q is parallel to and equal in length to the arm B, and the distance between the pivots $B'$ and $Q'$ corresponds to the length of the extension $D^2$. By pushing or drawing on the handle $D'$, the link D and its extension $D^2$, so that the arms B and C and the arm Q move in unison and always parallel one to the other, the verniers K and O always follow the motion of the square or right angle arm I at the time the arms B and C are swung, as will be readily understood by reference to Fig. 7, the vernier O indicating increasing length on the upward movement of the arms B and C, while at the same time the vernier K indicates decreasing length, and when the said arms B and C swing downward the vernier K indicates increasing length and the vernier O decreasing length.

Figure 25:
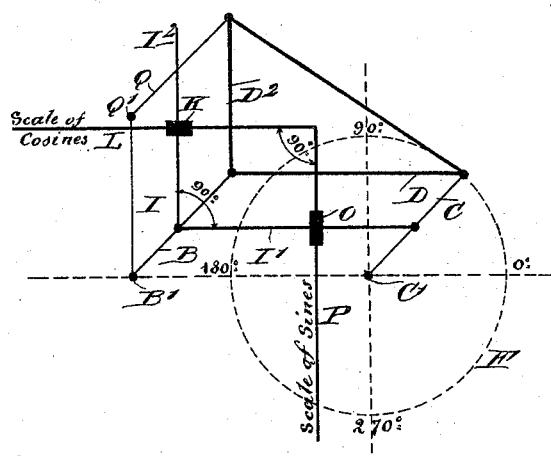
Figure 26:
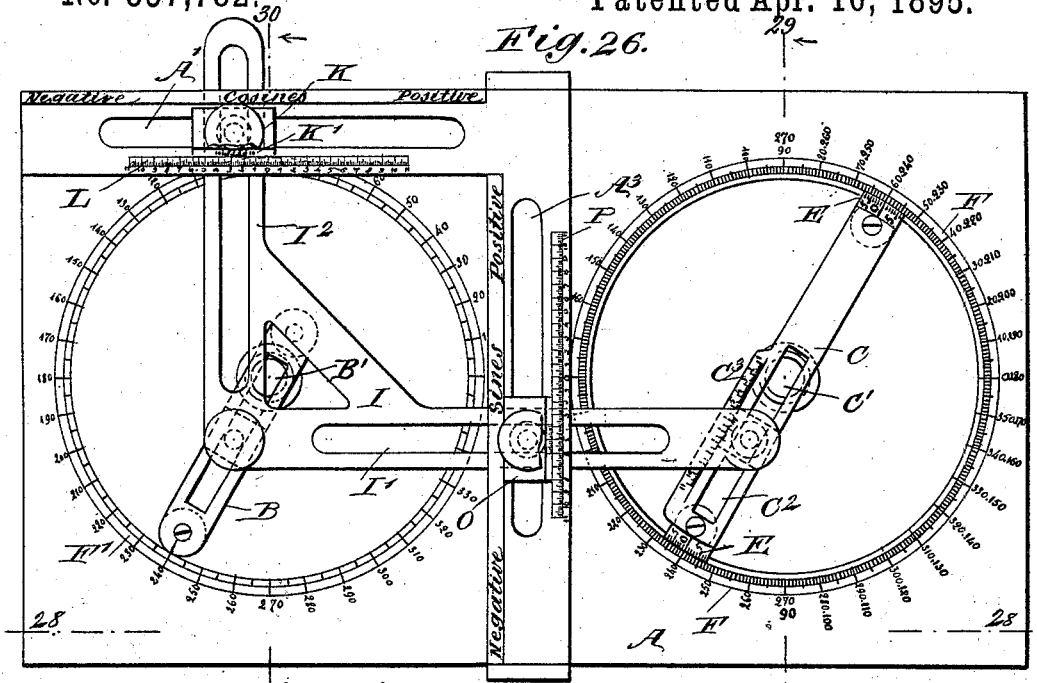
Figure 27:
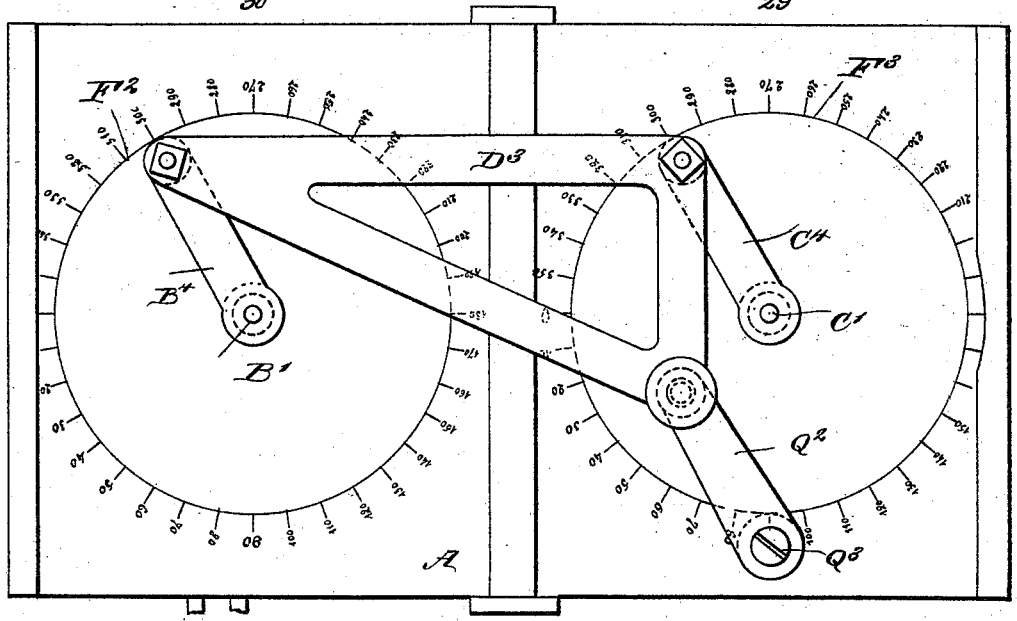

The instrument shown in Figs. 26 to 30 is arranged for giving directly sines and cosines for angles from zero to three hundred and sixty degrees, and for this purpose the graduation of the limb F is from zero to three hundred and sixty degrees, and the arms B and C are arranged to make a whole revolution on their pivots B', C' with the square I of Figs. 26 and 25 following their motions and giving sines and cosines on two fixed scales L and P standing at right angles one to the other.

The square and scales may be arranged in the four positions indicated in Figs. 9, 10, 11, and 12, or if the arm of the square is extended the scales and square can be arranged in eight positions indicated in Figs. 13 to 20 inclusive, the result being always the same. For the instrument showing on its limb F a graduation from zero to three hundred and sixty degrees the same main parts are used as for the one having a graduation from zero to forty-five degrees, but the parts are differently arranged as indicated in Fig. 25.

The arms B, C, revolve around their two pivots B' and C', and are always parallel in their motion, the arm C having a vernier reading on the graduated limb F. The arms B and C, are maintained parallel in their motion by the connection of link D and triangular link Q, or by link D and extension $D^2$ of Fig. 25, or link $D^3$ and arm $Q^2$ of Fig. 27, and the verniers K and O indicate the sines and cosines.

In order to permit a complete swinging around of the arms B and C, I extend their pivots through the base board or support A to the under side thereof, and secure on the lower ends of the pivots the arms $B^4$ and $C^4$ respectively, pivotally connected with each other by a triangular link $D^3$, same connection as link D and extension $D^2$ of Fig. 25, also pivotally connected with an auxiliary arm $Q^2$ fulcrumed at $Q^3$ on the under side of the base board, as plainly shown in Figs. 27 and 30. The arms $B^4$ and $C^4$, are adapted to indicate on circular graduations $F^2$ $F^3$, respectively formed or secured on the under side of the base board A, and as the said arms stand in perfect alignment with the arms B and C respectively, they indicate the same degrees as the said arms B and C do on their circular graduations F and F' respectively, see Figs. 26 and 27 respectively. One only of the four graduations F, F', $F^2$ and $F^3$ is necessary, and it can occupy either of the four positions alluded to. As shown in Fig. 26, the arm C is provided at each end with a vernier E.

The improved measuring and calculating instrument with any graduation of limb F from zero to three hundred and sixty degrees may have attached to it a compass or transit, or a telescope or sight of any kind, to be fixed either at pivot C' or pivot B', and with the line of sight following all motions of the arms B and C.

Having thus fully described my invention, I claim as new and desire to secure by Letters Patent—

1. An instrument of the class described, comprising a pivoted moving arm, a square or right angle arm pivotally connected with the said arm, and guides for keeping the members of the square parallel to their initial position during the movement of the said pivoted arm, substantially as described.

2. An instrument for the purpose described, comprising two pivoted parallel arms, a square whose respective members are pivotally connected to the said arms, slides having movement longitudinally of the members of the square, and stationary guideways for the slides, said guideways extending transversely of the members of the square, substantially as described.

3. A measuring instrument of the class described, comprising two pivoted parallel moving arms, a link for connecting the said arms for simultaneous movement, and a square or right angle arm held adjustable on the said parallel arms and moving with the same, substantially as shown and described.

4. A measuring instrument of the class described, comprising two pivoted parallel moving arms, a link for connecting the said arms for simultaneous movement, a square or right angle arm held adjustable on the said parallel arms and moving with the same, and verniers actuated by the legs of the said square and indicating on fixed graduations arranged at right angles to each other, substantially as shown and described.

5. A measuring instrument of the class described, comprising two pivoted parallel moving arms, a link for connecting the said arms for simultaneous movement, a vernier held on one of the said arms and indicating on a fixed graduation indicating degrees and subdivisions, the arm carrying the vernier and also provided with a distance graduation, a square or right angle arm held adjustably on the said parallel arms, a vernier held on one end of the said square and indicating on the said distance graduation of the corresponding arm, and two movable verniers controlled from the legs of the said square and indicating on fixed distance graduations arranged at right angles to each other, substantially as shown and described.

6. A measuring instrument of the class described, comprising two pivoted parallel moving arms, a link for connecting the said arms for simultaneous movement, a vernier held on one of the said arms and indicating on a fixed graduation indicating degrees and subdivisions, the arm carrying the vernier being also provided with a distance graduation, a square or right angle arm held adjustably on the said parallel arms, a vernier held on one end of the said square and indicating on the said distance graduation of the corresponding arm,— two movable verniers controlled from the legs of the said square and indicating on fixed distance graduations arranged at right angles to each other, and intermediate mechanism for connecting the said movable verniers with the legs of the said square, substantially as shown and described.

7. A measuring instrument of the class described, comprising two pivoted parallel moving arms, a link for connecting the said arms for simultaneous movement, a vernier held on one of the said arms and indicating on a fixed graduation indicating degrees and subdivisions, the arm carrying the vernier being also provided with a distance graduation, a square or right angle arm held adjustably on the said parallel arms, a vernier held on one end of the said square and indicating on the said distance graduation of the corresponding arm,— two movable verniers controlled from the legs of the said square and indicating on fixed distance graduations arranged at right angles to each other, and a handle held on the said link for actuating the latter and the arms and the square, substantially as shown and described.

8. A measuring instrument of the class described, comprising two pivoted parallel moving arms, a link for connecting the said arms for simultaneous movement, a vernier held on one of the said arms and indicating on a fixed graduation indicating degrees and subdivisions, the arm carrying the vernier being also provided with a distance graduation, a square or right angle arm held adjustably on the said parallel arms, a vernier held on one end of the said square and indicating on the said distance graduation of the corresponding arm, two movable verniers controlled from the legs of the said square and indicating on fixed distance graduations arranged at right angles to each other, and fixed stops for the said arms, to cause the first named vernier to indicate zero on the degree graduation, substantially as shown and described.

9. An instrument of the class described, comprising a pivoted moving arm, a sighting device secured on the said arm to move therewith, a square pivotally connected with the said arm, and guides for keeping the members of the square parallel to their initial position during the movement of the said pivoted arm, substantially as described.

10. An instrument of the class described, comprising a pivoted moving arm, a two-membered arm pivotally connected to the said moving arm, and guides for keeping the members of the two-membered arm parallel to their initial position during the movement of the said pivoted arm, substantially as described.

ADOLPHE L. LACOSTE.

Witnesses:
A. PLASSAU,
B. H. HARRISON.